Oct. 4, 1938.   D. J. KILLEN   2,131,809
VALVE
Filed Jan. 26, 1935
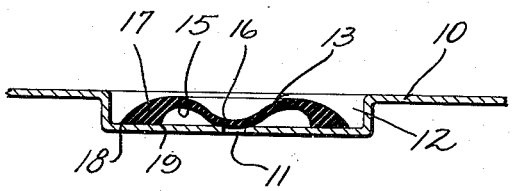
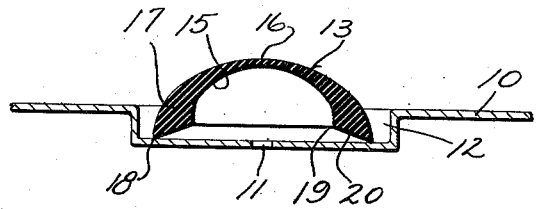
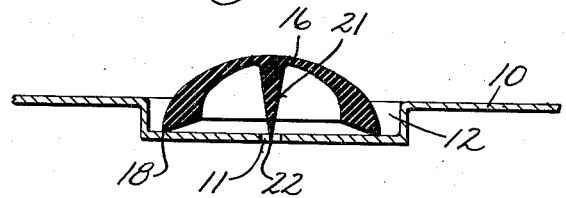
INVENTOR
Dan J. Killen
BY Wheeler, Wheeler and Wheeler
ATTORNEYS Patented Oct. 4, 1938

2,131,809

UNITED STATES PATENT OFFICE 2,131,809

VALVE

Dan J. Killen, Rapid City, S. Dak.

Application January 26, 1935, Serial No. 3,541

3 Claims. (Cl. 251—122)

My invention relates to improvements in valves.

The object of my invention is to provide a valve member of resilient material of such dimensions and so shaped as to be particularly suitable as a closure member for an apertured plate.

More specifically stated, it is the object of my invention to provide a valve member of rubber or other resilient material thickened at the margins and thinned centrally so that the thin, more resilient portion in the center may be drawn or pressed to a sealing position with reference to the margins of an aperture and at the same time to provide a configuration adjacent the side margins of the valve member so that the distortion of the central portion will not lift the extreme side margins away from the surface upon which the valve is generally supported.

In the drawing:

Figure 1 is a vertical section through a portion of an apertured fruit jar cover and showing my valve member in sealing position.

Figure 2 is a view similar to that in Figure 1 and showing the valve member when not under pressure.

Figure 3 is a view similar to that in Figure 1, but showing an alternative construction of valve member.

Like parts are designated by the same reference characters throughout the several views.

The valve member with which this invention is concerned is intended to perform substantially the same general function as the valve member shown in my Patent No. 1,773,311, issued August 19, 1930, upon a Vacuum fruit jar cover, and in the attached drawing I have shown my new and improved valve member associated with a similar fruit jar cover 10 apertured at 11 approximately centrally of a depressed portion 12 of the cover.

The cover is intended for use as a closure member of a fruit jar, (not shown), from which air may be evacuated so that any closure member for the aperture 11 will be under pressure of the external atmosphere which is prevented by my valve member 13 from passing through the aperture 11.

My valve member 13 is composed of resilient material, preferably rubber or a substance of similar characteristics, which I shape in the form of a cup, the external surface of which comprises a circumference upon a comparatively large radius, and the internal surface 15 of which is formed upon a spherical circumference of smaller radius. The central portion, or crown, 16 of the dome-shaped element 13 is therefore thinned and more resilient than the portions at 17 adjacent margin 18, which portions 17 are thicker and less resilient.

Commencing at a point 19 I provide my valve member with a face 20, which in the position of the valve shown in Figure 2 is sustained at an angle to the supporting surface comprising the cover 10, so that when my valve member is under pressure, as indicated in Figure 1 and the central portion 16 is depressed so as to close the aperture 11, the face 20 is brought in flat contact with the cap 10. For the purposes of clear description it may be said that the point of incidence of the valve and cover is at the circle formed by the margin 18 when the valve is not under pressure.

The angularity of the surface 20, with reference to the vertical axis of the valve 13, is such that in the extreme distortion of the central portion 16 of the valve to close an aperture 11 there is no tendency to distort the extreme margin 18 of the valve member or draw said margins away from the cover. In full close position, therefore, the broad annular surface 20 is in pressure relationship to the flat surface of the cover material 10.

In Figure 3 I have shown an alternative construction wherein the central thinned portion 16 is provided with a centering point 21 long enough so that the tip 22 thereof extends axially beyond the margins 18 so as to be easily and readily disposed in an aperture 11, not only to position the entire valve body with reference to the aperture, but also to provide an additional closure element for the aperture 11, when the pressure upon the valve drives the point 21 as a plug into the aperture.

I claim:

1. The combination with an apertured plate, of a valve member of resilient material over the aperture including an outer surface curved on a large radius but less than 160 degrees, an inner surface curved on a small radius whereby the crown is thinned, and margins cut on an angle whereby to contact the plate only at the point of incidence of the outer circumference when the valve is not under pressure, and whereby the margins will be in face contact with the plate when the valve is under pressure.

2. The combination with an apertured member, of a valve for the aperture comprising a normally arcuately cupped body of resilient material, in which the central portion of the arc is thinned for greater resiliency, the side margins of the valve are thinned and extended to a point of incidence, and the central portion of the arc is provided with a centering point, a portion of the inner surface of the valve being faced at an angle to the supporting surface of the member when the valve is not under pressure whereby when the valve is under pressure and the point is tightly fitted in the aperture, said face is in flat contact with said supporting surface.

3. The combination with an apertured member, of a valve for the aperture comprising a normally arcuately cupped body of resilient material in which the central portion of the arc is thinned for greater resiliency and adapted to flex downwardly into contact with the margins of the aperture, and the side margins of the valve are provided with a face normally at an angle to the surface of the member and adapted to be adjusted into face contact with the member when the central portion of the valve is flexed downwardly.

DAN J. KILLEN.